US012578904B2

(12) United States Patent
He et al.

(10) Patent No.: US 12,578,904 B2
(45) Date of Patent: Mar. 17, 2026

(54) METHOD FOR HANDLING ACCESS COMMANDS WITH MATCHING AND UNMATCHING ADDRESSES AND SOLID-STATE STORAGE DEVICE OPERATING THE SAME

(71) Applicant: KIOXIA CORPORATION, Tokyo (JP)

(72) Inventors: Cheng Chan He, Hsinchu (TW); Yi Chiang Wang, Hsinchu (TW); Hsuan Chih Liu, Hsinchu (TW)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/678,343

(22) Filed: May 30, 2024

(65) Prior Publication Data

US 2025/0044988 A1    Feb. 6, 2025

(30) Foreign Application Priority Data

Jul. 31, 2023    (CN) ......................... 202310952274.X
Jul. 31, 2023    (TW) ................................. 112128638

(51) Int. Cl.
G06F 3/06            (2006.01)
(52) U.S. Cl.
CPC .......... G06F 3/0659 (2013.01); G06F 3/0604 (2013.01); G06F 3/0679 (2013.01)
(58) Field of Classification Search
CPC ....... G06F 3/0659; G06F 3/0604; G06F 3/061
See application file for complete search history.

(56) References Cited

U.S. PATENT DOCUMENTS

| | | | | |
|---|---|---|---|---|
| 5,870,625 | A * | 2/1999 | Chan ..................... | G06F 9/3824 |
| | | | | 712/E9.046 |
| 2017/0123667 | A1* | 5/2017 | Richter .................. | G06F 3/061 |
| 2018/0189172 | A1* | 7/2018 | Kim ..................... | G06F 3/0631 |
| 2020/0026464 | A1* | 1/2020 | Yen ..................... | G06F 12/1009 |
| 2024/0361957 | A1* | 10/2024 | Hahn ..................... | G06F 3/061 |

FOREIGN PATENT DOCUMENTS

CN           107992436 B      4/2021

\* cited by examiner

*Primary Examiner* — Hosain T Alam
*Assistant Examiner* — Nicholas A. Paperno
(74) *Attorney, Agent, or Firm* — Maier & Maier, PLLC

(57)            ABSTRACT

A solid-state storage device is provided. The solid-state storage device is electrically connected to a host. The solid-state storage device includes a controller, a non-volatile memory, and a volatile memory. The non-volatile memory is electrically connected to the controller. The volatile memory is electrically connected to the controller. The volatile memory includes a submission queue and a completion queue. The controller is configured to fetch an access command from the host, and record the access command in the submission queue. The access command corresponds to a first logical address. The controller is configured to determine whether a first write command is in the submission queue to generate a determination result. The first write command corresponds to a second logical address identical to the first logical address. The controller is configured to decide a processing method of the access command according to the determination result.

10 Claims, 10 Drawing Sheets

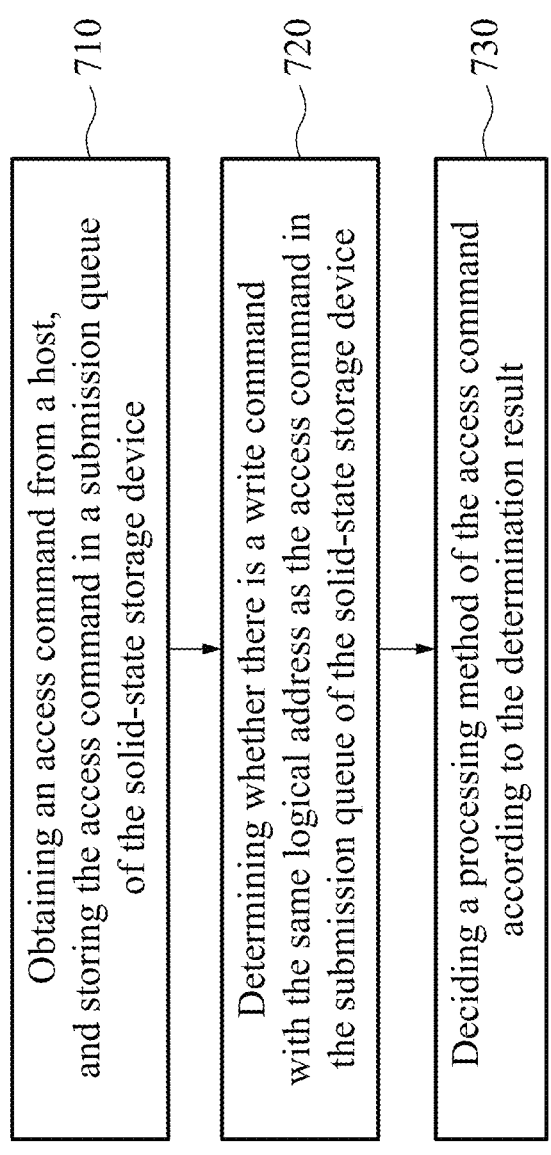

Obtaining an access command from a host, and storing the access command in a submission queue of the solid-state storage device ⟋710

Determining whether there is a write command with the same logical address as the access command in the submission queue of the solid-state storage device ⟋720

Deciding a processing method of the access command according to the determination result ⟋730

FIG. 7

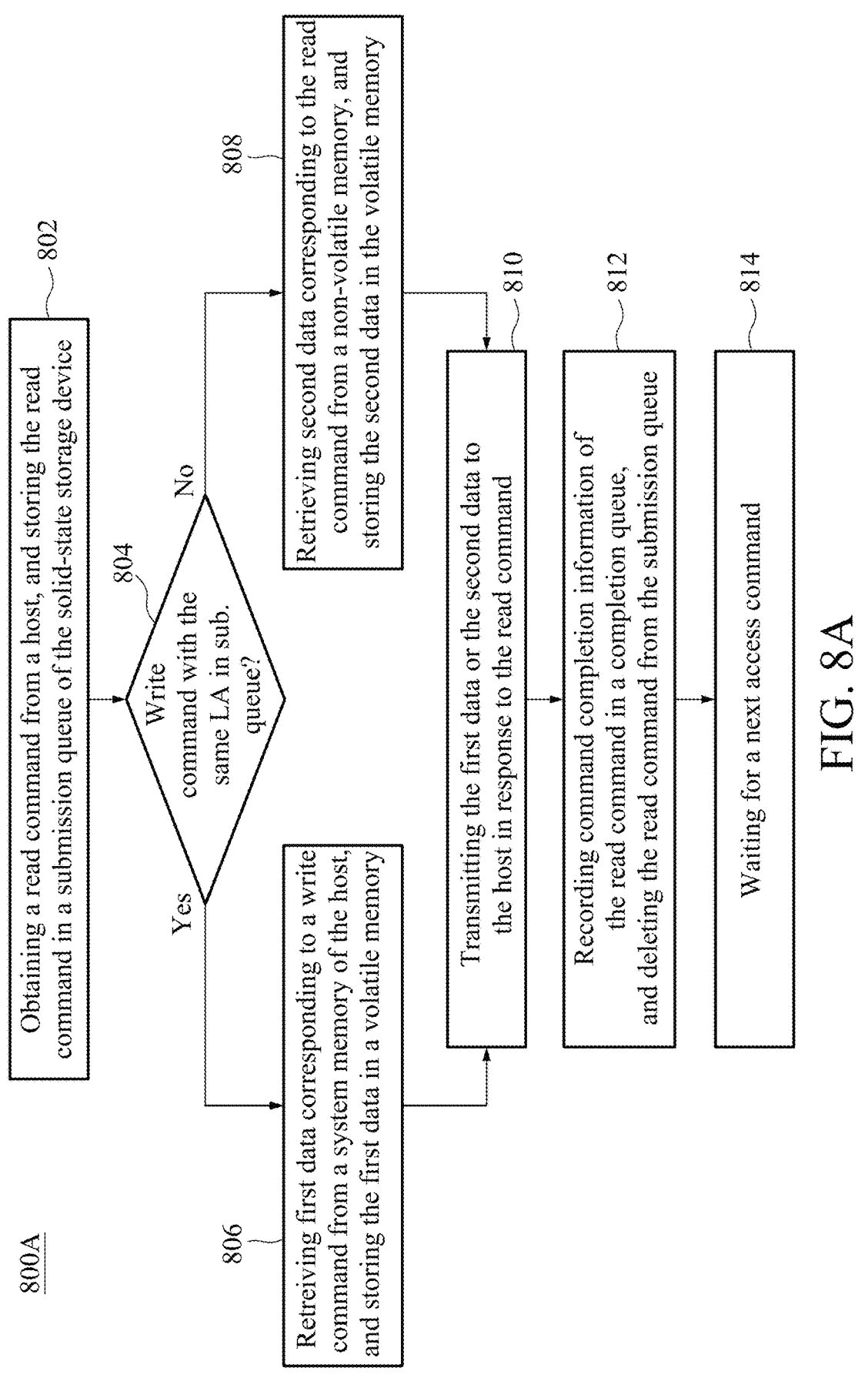

800A

802 Obtaining a read command from a host, and storing the read command in a submission queue of the solid-state storage device 804 Write command with the same LA in sub. queue?

806 Retreiving first data corresponding to a write command from a system memory of the host, and storing the first data in a volatile memory 808 Retrieving second data corresponding to the read command from a non-volatile memory, and storing the second data in the volatile memory 810 Transmitting the first data or the second data to the host in response to the read command 812 Recording command completion information of the read command in a completion queue, and deleting the read command from the submission queue 814 Waiting for a next access command

FIG. 8A

METHOD FOR HANDLING ACCESS COMMANDS WITH MATCHING AND UNMATCHING ADDRESSES AND SOLID-STATE STORAGE DEVICE OPERATING THE SAME

CROSS-REFERENCE TO RELATED APPLICATIONS

The present application is based on, and claims priority from, Taiwan Application Serial Number 112128638, filed 31 Jul. 2023, and China Application Serial Number 202310952274.X, filed 31 Jul. 2023, the disclosures of which are hereby incorporated by reference in their entirety.

FIELD OF THE DISCLOSURE

The present disclosure relates to solid-state storage devices, and, in particular, a solid-state storage device and a data access method thereof.

BACKGROUND

Solid-state storage devices utilizing non-volatile memory have become increasingly prevalent in various computer systems as technology has advanced. However, service life of the non-volatile memory is directly impacted by the frequency of data read and write operations. For example, frequent access to the non-volatile memory, such as NAND flash memory, in solid-state storage devices can significantly decrease its service life.

SUMMARY OF THE DISCLOSURE

Accordingly, a solid-state storage device and a data access method thereof are provided in the present disclosure to address the aforementioned issues.

In an aspect of the present disclosure, a solid-state storage device is provided. The solid-state storage device is electrically connected to a host. The solid-state storage device includes a controller, a non-volatile memory, and a volatile memory. The non-volatile memory is electrically connected to the controller. The volatile memory is electrically connected to the controller. The volatile memory includes a submission queue and a completion queue. The controller is configured to fetch an access command from the host, and to record the access command in the submission queue. The access command corresponds to a first logical address. The controller is configured to determine whether a first write command is in the submission queue to generate a determination result. The first write command corresponds to a second logical address identical to the first logical address. The controller is configured to decide a processing method of the access command according to the determination result.

In another aspect of the present disclosure, a data access method for use in a solid-state storage device is provided. The solid-state storage device is electrically connected to a host, and includes a controller, a volatile memory, and a non-volatile memory. The method includes the following steps: utilizing the controller to fetch an access command from the host, and to record the access command in a submission queue of the volatile memory, wherein the access command corresponds to a first logical address; utilizing the controller to determine whether a first write command exists in the submission queue to generate a determination result, wherein the first write command corresponds to a second logical address identical to the first logical address; and utilizing the controller to decide a processing method of the access command according to the determination result.

BRIEF DESCRIPTION OF THE DRAWINGS

Aspects of the present disclosure are best understood from the following detailed description when read with the accompanying figures. It is noted that in accordance with the standard practice in the industry, various features are not drawn to scale. In fact, the dimensions of the various features may be arbitrarily increased or reduced for clarity of discussion.

FIG. 7 is a flowchart of a data access method for use in a solid-state storage device in accordance with an embodiment of the present disclosure.

FIG. 8A is a flowchart of a data access method 800A of a read command in accordance with the embodiment of FIG. 7 of the present disclosure.

DETAILED DESCRIPTION

The following description is for the purpose for describing preferred embodiments of the present disclosure, with the aim of describing the basic spirit of the present disclosure, but not to limit the present invention. The actual content of the invention should be referred to the appended claims.

It should be understood that the words "comprising" and "including" used in this specification are used to indicate the existence of specific technical features, numerical values, method steps, work processes, elements and/or components, but not to exclude additional technical features, numerical values, method steps, operations, elements, components, or any combination thereof.

The use of words such as "first", "second", and "third" in the scope of the patent application are used to modify the elements in the scope of the Patent Application, and are not used to indicate the priority order or precedence relationship between them, one component precedes another component, or the time sequence in which method steps are executed, and is only used to distinguish components with the same name.

The term "configured to" may describe or claim that various units, circuits, or other components are "configured to" perform a task or tasks. In such contexts, the term "configured to" implies that the units/circuits/components include a structure (e.g., circuitry) that performs their task(s) during operation. Thus, a specified unit/circuit/component may be said to be configured to perform the task even when the unit/circuit/component is not currently operating (e.g., not turned on). Such units/circuits/components accompanied by the term "configured to" include hardware—for example: circuits, memory (which stores program commands that are executable to perform operations), etc. Additionally, "configured to" may include a generic structure (e.g., general circuitry) that is manipulated by software and/or firmware (e.g., an FPGA or a general-purpose processor executing the software) to operate in a manner that enables the execution of the task(s) to be solved. Further, "configured to" may include adapting a manufacturing process (e.g., a semiconductor manufacturing equipment) to produce a device (e.g., an integrated circuit) adapted to perform one or more tasks.

Figure 1:
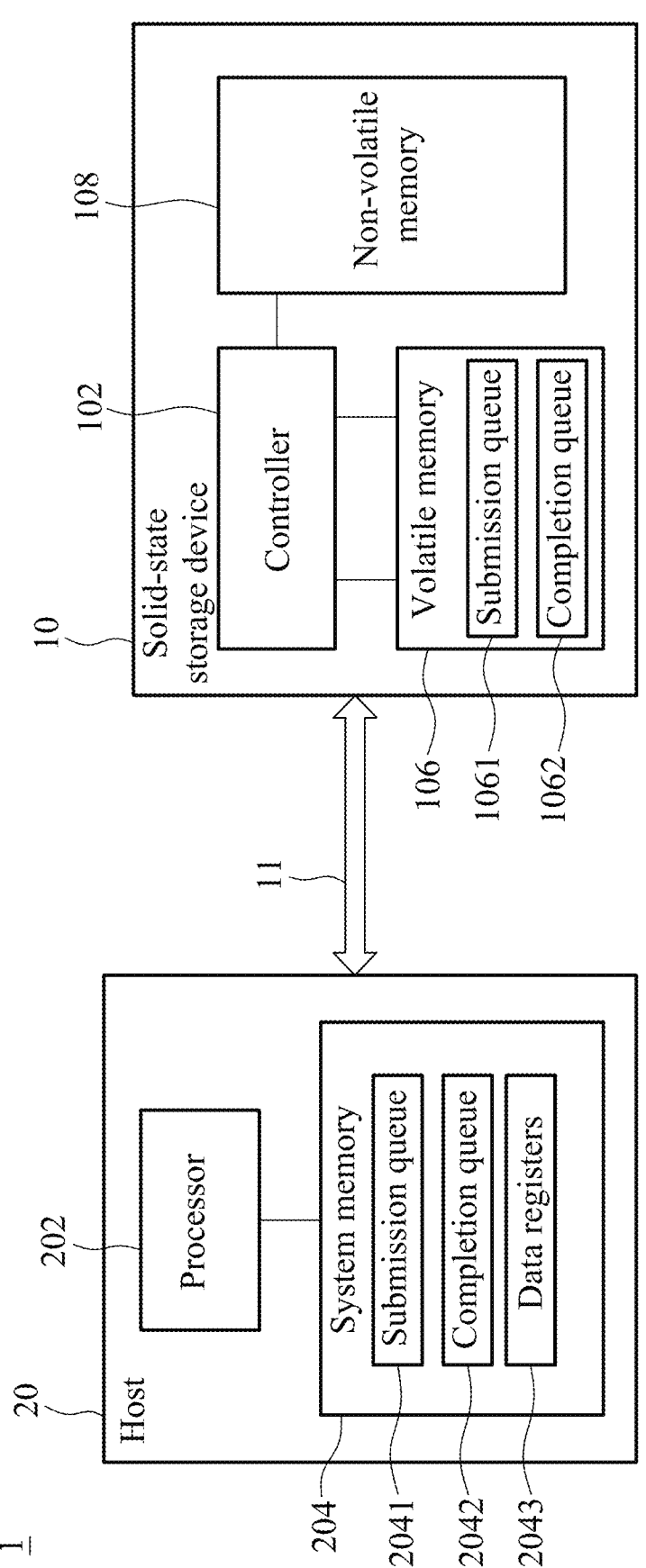
FIG. 1 is a block diagram of a computer system in accordance with an embodiment of the present disclosure.

FIG. 1 is a block diagram of a computer system in accordance with an embodiment of the present disclosure.

As shown in FIG. 1, the computer system 1 may include a solid-state storage device 10 and a host 20. The solid-state storage device 10 may be electrically connected to the host 20 through bus 11 for command and data transmission. In some embodiments, bus 11 may be a Universal Serial Bus (USB), a Serial Advanced Technology Attachment (SATA) bus, or a Peripheral Component Interconnect Express (PCI Express, PCI-e) bus, etc., but the disclosure is not limited thereto.

The solid-state storage device 10 may include a controller 102, a volatile memory 106 and a non-volatile memory 108. The controller 102 may be electrically connected to the volatile memory 106 and the non-volatile memory 108, and used to control data access of the volatile memory 106 and the non-volatile memory 108. In some embodiments, the controller 102 may be, for example, a general-purpose processor, a microcontroller, an application-specific integrated circuit (ASIC), or a field programmable gate array (FPGA), etc., but the present disclosure is not limited thereto.

The volatile memory 106 may include, for example, a dynamic random access memory (DRAM) and/or a static random access memory (SRAM), but the disclosure is not limited thereto. In some embodiments, the volatile memory 106 may be disposed external to the controller 102. In some other embodiments, the volatile memory 106 may be integrated into the controller 102. The non-volatile memory 108 may be, for example, a NAND flash memory for storing write data provided by the host 20.

The host 20 may include, for example, a processor 202 and a system memory 204, and the processor 202 is electrically connected to the system memory 204. In some embodiments, the processor 202 may include, for example, a central processing unit, a general-purpose processor, a microprocessor, etc., but the disclosure is not limited thereto. In addition, the processor 202 may include a controller (not shown) controlling data access to the system memory 204. The system memory 204 may include, for example, DRAM, but the disclosure is not limited thereto.

In some embodiments, the host 20 can support the Non-Volatile Memory Express (NVME) protocol, and the system memory 204 may be equipped with a submission queue 2041, a completion queue 2042, and data registers 2043. The submission queue 2041 may be configured to record access commands issued by the processor 202, and the completion queue 2042 may be configured to record the status of the completed access commands of the solid-state storage device 10. The data registers 2043 may be configured to store data to be written to the solid-state storage device 10 by the host 20 and to store data read from the solid-state storage device 10 by the host 20.

In some embodiments, the solid-state storage device 10 may support NVME, and the controller 102 may retrieve access commands from the submission queue 2041 of the host 20, such as write commands, read commands, etc. The volatile memory 106 may be equipped with a submission queue 1061 and a completion queue 1062. The submission queue 1061 may be used to record the access commands retrieved from the host 20, and the completion queue 1062 may be used to record the status of the access commands completed by the solid-state storage device 10.

The non-volatile memory 108 may include a plurality of blocks, and each block may include a plurality of pages. For example, non-volatile memory 108 can include 1024 blocks, and each block can include 64 pages, with capacity of each page 16 KB and each block 1 MB. The aforementioned data is for purposes of description, and the manufacturer of the non-volatile memory 108 can determine the number of pages in each block and the capacity of each page.

Figure 2:
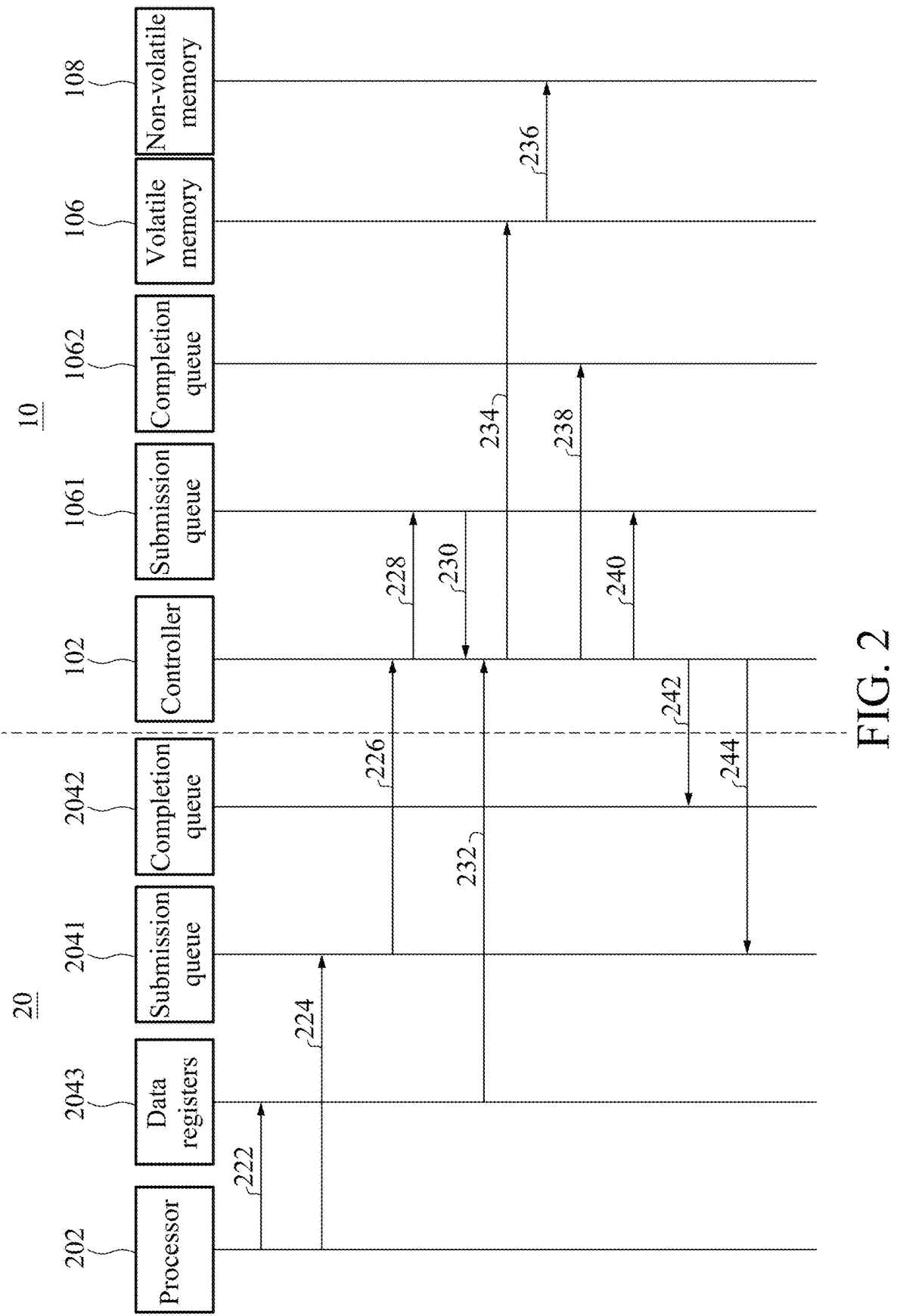
FIG. 2 is a flowchart of operations associated with a write command according to an embodiment of the present disclosure.
Figure 3A:
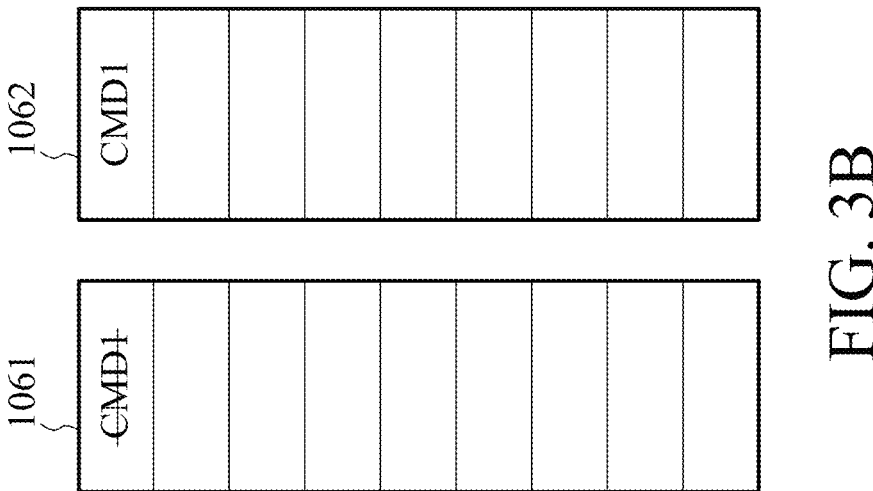
FIGS. 3A and 3B are diagrams of the submission queue and the completion queue of the solid-state storage device according to the embodiment of FIG. 2 of the present disclosure.
Figure 3B:
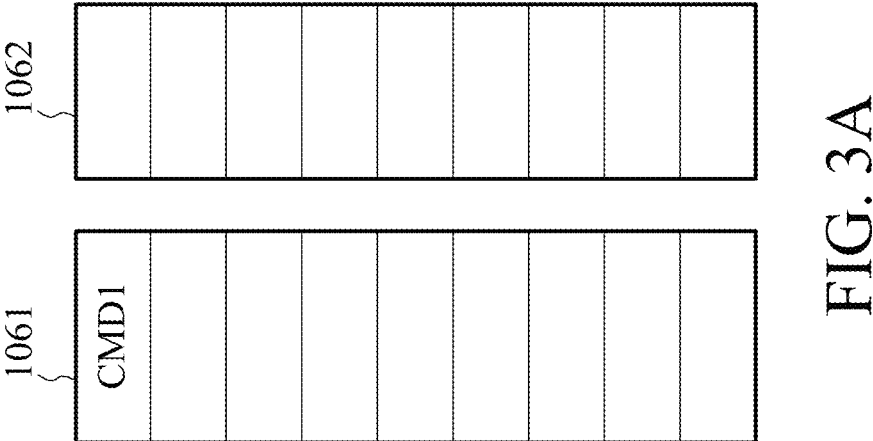

FIG. 2 is a flowchart of operations associated with a write command according to an embodiment of the present disclosure. FIGS. 3A and 3B are diagrams of the submission queue 1061 and the completion queue 1062 of the solid-state storage device 10 according to the embodiment of FIG. 2 of the present disclosure.

In some embodiments, when the host 20 starts to store write data to the solid-state storage device 10, the processor 202 stores the write data corresponding to a write command CMD1 in the data registers 2043 of the system memory 204 (arrow 222), and the write command CMD1 to the submission queue (arrow 224). For example, the content of the write command CMD1 may include the logical address, such as 0x2000, and size, such as 16 KB, of the write data.

In some embodiments, the controller 102 of the solid-state storage device 10 may periodically check for new access commands in the submission queue 2041. The controller 102 of the solid-state storage device 10 may fetch the write command CMD1 from the submission queue 2041 (arrow 226), and record the fetched write command CMD1 in the submission queue 1061 of the volatile memory 106 (arrow 228), as shown in FIG. 3A.

It should be noted that the solid-state storage device 10 may have a very long response time for responding a write command received from the host 20. However, in the current embodiment, the controller 102 fetches the write command CMD1 from the submission queue 2041 and then waits for the next access command rather than immediately executing the fetched write command CMD1. During this time, the write command CMD1 will be pending and remain recorded in the submission queue 1061, while the corresponding write data of the write command CMD1 will remain stored in the data registers 2043 of the host 20.

The controller 102 can determine timing of execution of write command CMD1. The following embodiment illustrates execution flow of the write command CMD1 when the controller 102 initiates execution of write command CMD1.

When the controller 102 initiates execution of write command CMD1, as shown in FIG. 2, the controller 102 fetches the write command CMD1 from the submission queue 1061 (arrow 230), and receives the write data corresponding to the write command CMD1 from the data registers 2043 according to the content of the write command CMD1 (arrow 232). The controller 102 temporarily stores the write data in the volatile memory 106 (arrow 234), and then programs the write data into the non-volatile memory 108 (arrow 236).

When the write data has been successfully programmed into the non-volatile memory 108, the controller 102 writes the command completion information corresponding to the write command CMD1 to the completion queue 1062 (arrow 238), and deletes the write command CMD1 from the submission queue 1061 (arrow 240), as shown in FIG. 3B. The controller 102 then writes the command completion information corresponding to the write command CMD1 to the completion queue 2042 of the host 20 (arrow 242), and deletes the entry corresponding to the write command CMD1 from the submission queue 2041 of the host 20 (arrow 244).

In some embodiments, the controller 102 may set the phase tag, based on the command completion information corresponding to the write command CMD1 in the completion queue 2042, to 1, and issues an interrupt signal to the processor 202 to notify the processor 202 that new command completion information has been submitted to the completion queue 2042. After the processor 202 receives the interrupt signal, the processor 202 can use the set stage tag to view the newly submitted entry in the completion queue 2042. When the newly submitted entry indicates that the command has successfully executed, the processor 202 closes the events associated with the write command CMD1 and records that the data of the write command CMD1 has been successfully written to the solid-state storage device 10.

It should be noted that in the embodiment of the present disclosure, the controller 102 fetches the write command CMD1 from the submission queue 2041 and waits for the next access command rather than immediately executing the fetched write command CMD1. In other words, in the embodiment of FIG. 2, while the controller records the fetched write command CMD1 in the submission queue 1061 of the volatile memory 106 (arrow 228) until the controller 102 fetches the write command CMD1 from the submission queue (arrow 230), the controller 102 can process at least one other access command.

Specifically, the solid-state storage device 10 may have a very long response time for responding to a write command received from the host 20, allowing the controller 102 to maintain the write command CMD1 as pending and wait for the subsequent access command after fetching the write command CMD1 from the submission queue 2041. This approach helps the solid-state storage device 10 process subsequent read commands and write commands issued by the host 20 more efficiently. For details, please refer to the embodiments of FIG. 5 and FIG. 6.

Figure 4C:
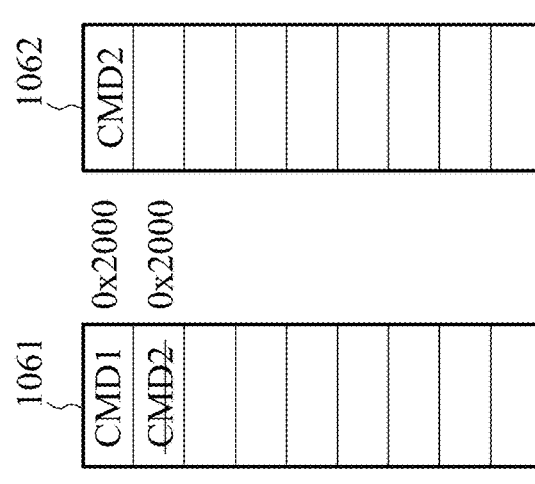
FIGS. 4A to 4C are diagrams of the submission queue and the completion queue of the solid-state storage device in accordance with the embodiment of FIG. 5 of the present disclosure.
Figure 4B:
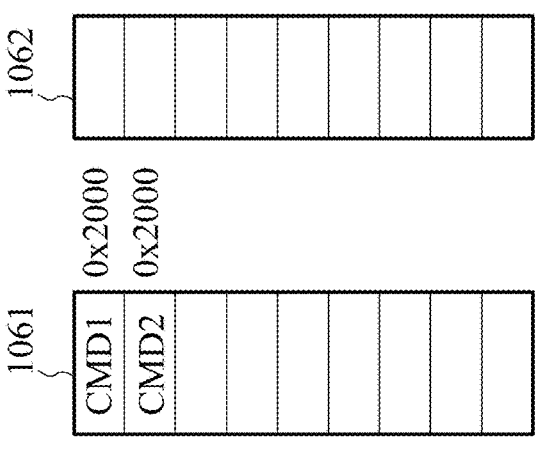
Figure 4A:
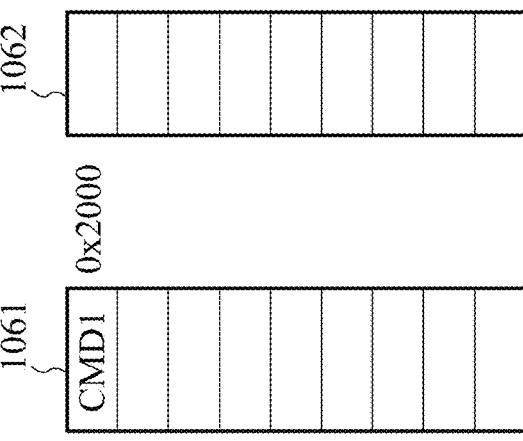
Figure 5:
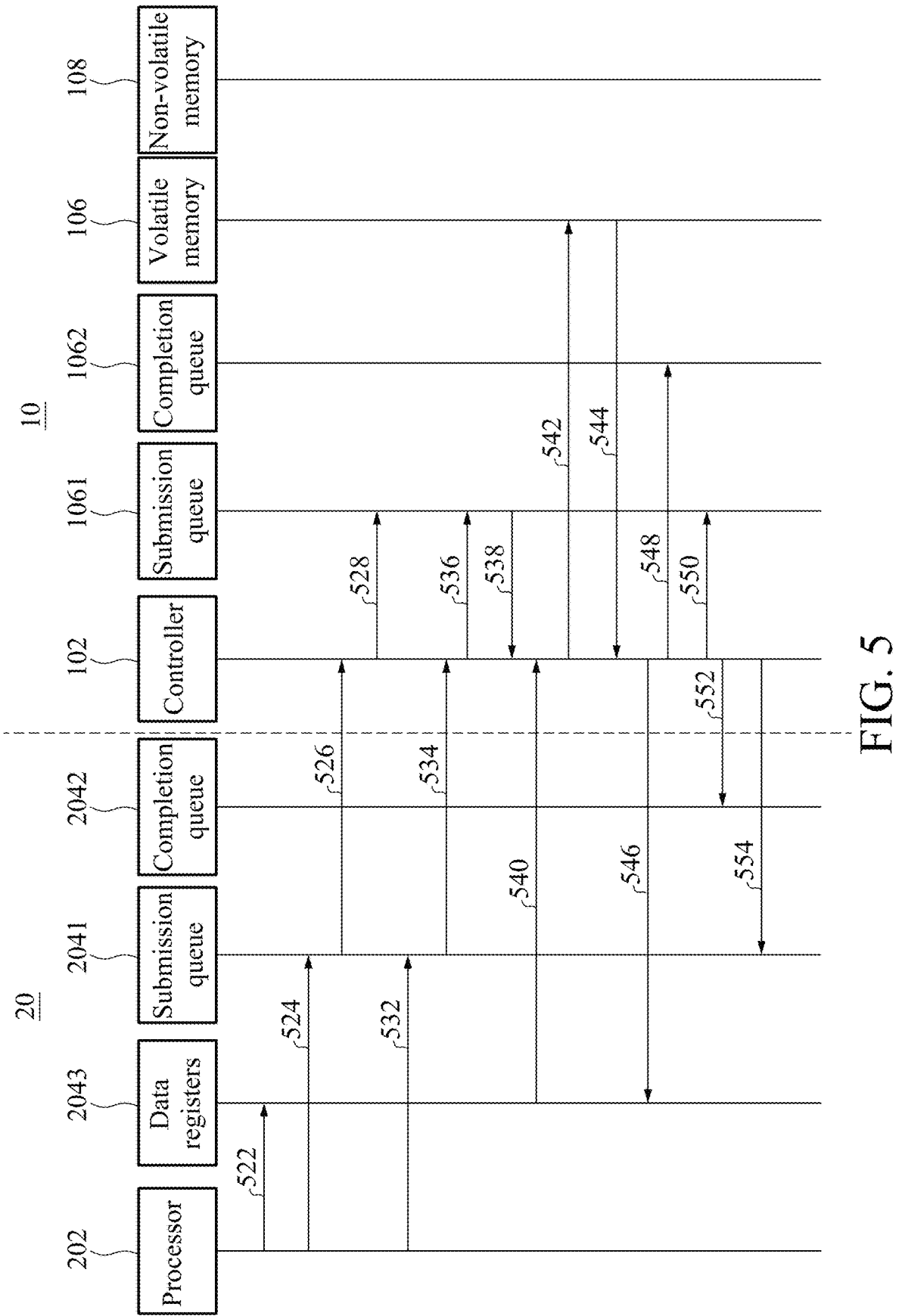
FIG. 5 is a flowchart of operations of a read command according to yet another embodiment of the present disclosure.

FIG. 5 is a flowchart of operations of a read command according to yet another embodiment of the present disclosure. FIGS. 4A to 4C are diagrams of the submission queue 1061 and the completion queue 1062 of the solid-state storage device 10 in accordance with the embodiment of FIG. 5 of the present disclosure.

In some embodiments, when the host 20 seeks to store the first data into the solid-state storage device 10, the processor 202 stores the first data corresponding to a write command CMD1 in the data registers 2043 (arrow 522), and writes the write command CMD1 to the submission queue 2041 (arrow 524). For example, if the write command CMD1 seeks to write the first data of 16 KB to the logical address of 0x2000, content of the write command CMD1 includes the logical address of the first data, such as 0x2000, and the size of the first data, such as 16 KB.

In some embodiments, the controller 102 of the solid-state storage device 10 can periodically check for any new access commands in the submission queue 2041. The controller 102 may fetch the write command CMD1 from the submission queue 2041 (arrow 526), and record the fetched write command CMD1 in the submission queue 1061 of the volatile memory 106 (arrow 528), as shown in FIG. 4A.

As previously mentioned, after fetching the write command CMD1 from the submission queue 2041, the controller 102 does not execute the fetched write command CMD1, indicating that the controller 102 does not immediately write the first data corresponding to the write command CMD1 to the non-volatile memory 108. At this time, the write command CMD1 is pending, and the controller 102 will wait for the next access command. Meanwhile, the write command CMD1 will remain recorded in the submission queue 1061, and the first data corresponding to the write command CMD1 will remain stored in the data registers 2043 of the host 20.

When the host 20 subsequently issues a read command CMD2 to read the first data from the solid-state storage device 10, the read command CMD2 indicates that the first data located at the logical address of 0x2000 is to be read. The content of the read command CMD2 includes the logical address 0x2000 of the first data to be read. At this time, the processor 202 writes the read command CMD2 to the submission queue 2041 (arrow 532).

Next, the controller 102 fetches the read command CMD2 from the submission queue 2041 (arrow 534), and records the fetched read command CMD2 in the submission queue 1061 of the volatile memory 106 (arrow 536), as shown in FIG. 4B.

In an embodiment of the present disclosure, when the controller 102 receives a read command from the host 20, the controller 102 will first determine whether there is a write command with the same logical address ("LA") as the read command in the submission queue 1061, and decide the processing method of the read command based on the determination result.

FIG. 5 and FIGS. 4A to 4C are diagrams illustrating how the read command is processed when there is a write command with the same logical address as the read command in the submission queue 1061. The controller 102 reads the read command CMD2 from the submission queue 1061 (arrow 538), and determines that there is a write command CMD1 with the same logical address 0x2000 as the read command CMD2 in the submission queue 1061, as shown in FIG. 4B. Next, the controller 102 reads the first data corresponding to the write command CMD1 temporarily stored in the data registers 2043 from the system memory 204 according to the write command CMD1 (arrow 540), and stores the read first data in volatile memory 106 temporarily (arrow 542). The controller 102 reads the first data from the volatile memory 106 (arrow 544), and transmits the read first data to the host 20, so that the first data is stored in the data registers 2043 of the system memory 204 (arrow 546).

For example, although the controller 102 executes the read command CMD2, because the logical address of the read command CMD2 is the same as the logical address of the write command CMD1 previously recorded in the submission queue 1061, the controller 102 reads the first data corresponding to the write command CMD1 from the data registers 2043 of the host 20 according to the physical space configuration information of the write command CMD1. The physical space configuration information refers to the physical storage address information of the first data in the data registers 2043 of the host 20, and can be defined by the standard physical region page (PRP) information or the scatter/gather list in the NVME standard, but the present disclosure is not limited thereto.

When the controller 102 successfully transmits the first data to the host 20 and stores the same in the data registers 2043 of the system memory 204, the controller 102 records the command completion information corresponding to the read command CMD2 (or the read command CMD2 itself) to the completion queue 1062 (arrow 548), and deletes the read command CMD2 from the submission queue 1061 (arrow 550), as shown in FIG. 4C. The controller 102 then writes the command completion information corresponding to the read command CMD2 to the completion queue 2042 of the host 20 (arrow 552), and deletes the entry corresponding to the read command CMD2 from the submission queue 2041 of the host 20 (arrow 554).

In some embodiments, the controller 102 may set the phase tag corresponding to the command completion information of the read command CMD2 in the completion queue 2042 to 1, and send an interrupt signal to the processor 202 to notify the processor 202 that new command completion information has been submitted to the completion queue 2042. When the processor 202 receives the interrupt signal, the processor 202 can use the phase tag to view newly submitted entry in the completion queue 2042. When the newly submitted entry indicates that the read command CMD2 has executed successfully, the processor 202 will close events associated with the read command CMD2 and record that the first data of the read command CMD2 has been successfully written to the data registers 2043 of the system memory 204.

It should be noted that, as shown in FIGS. 4A to 4C, during the aforementioned execution process of the read command CMD2, the write command CMD1 still exists in the submission queue 1061 of the solid-state storage device 10, indicating that the controller 102 does not program the first data corresponding to the write command CMD1 into the non-volatile memory 108. In other words, the write command CMD1 is still pending, and the first data corresponding to the write command CMD1 is still stored in the data register 2043 of the host 20.

Figure 6:
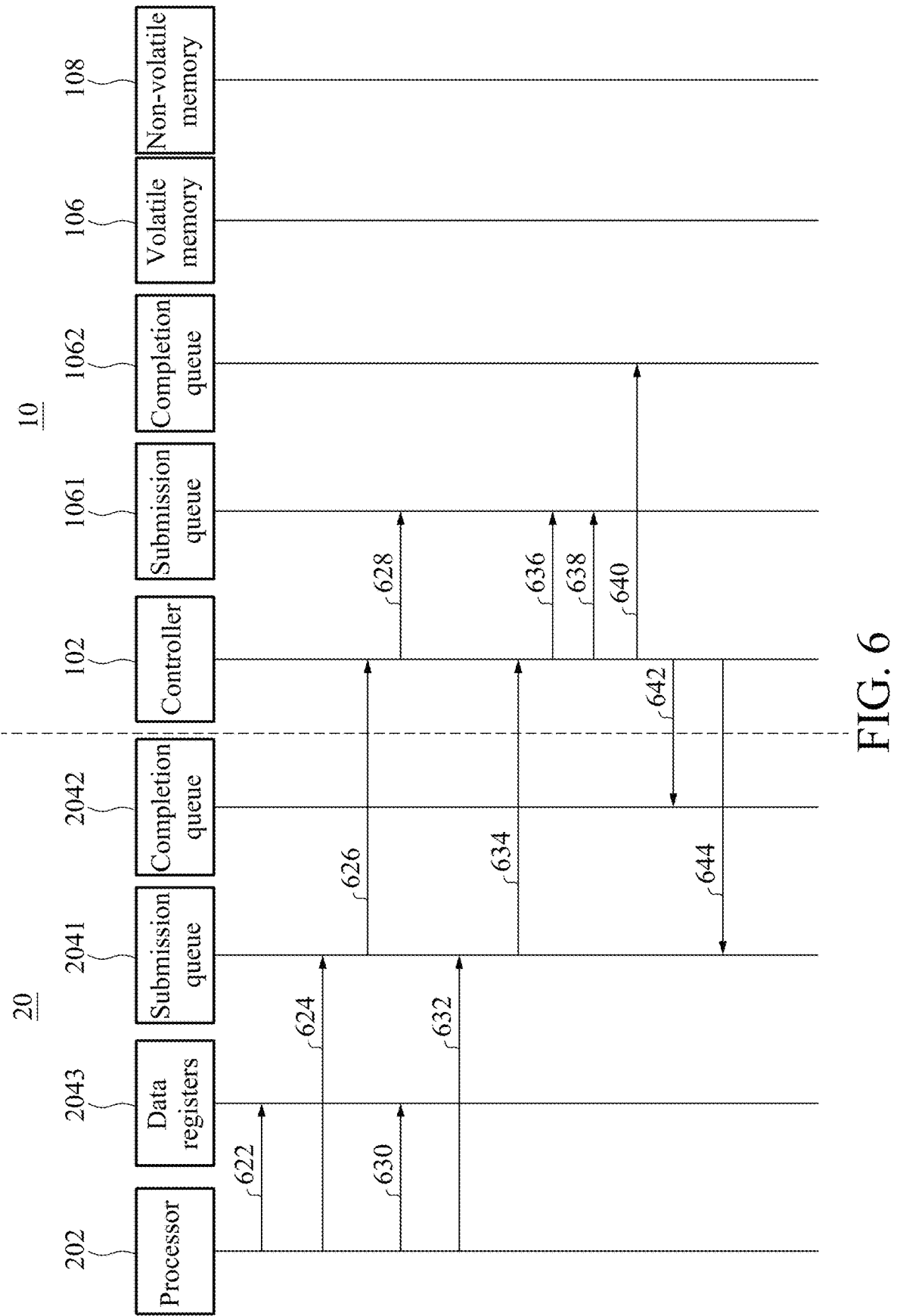
FIG. 6 is a flowchart of operations associated with a write command in accordance with yet another embodiment of the present disclosure.
Figure 9C:
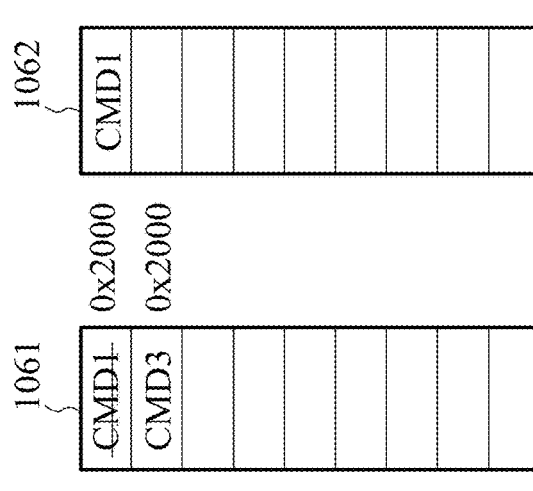
FIGS. 9A to 9C are diagrams of the submission queue and the completion queue of the solid-state storage device according to the embodiment of FIG. 6 of the present disclosure.
Figure 9B:
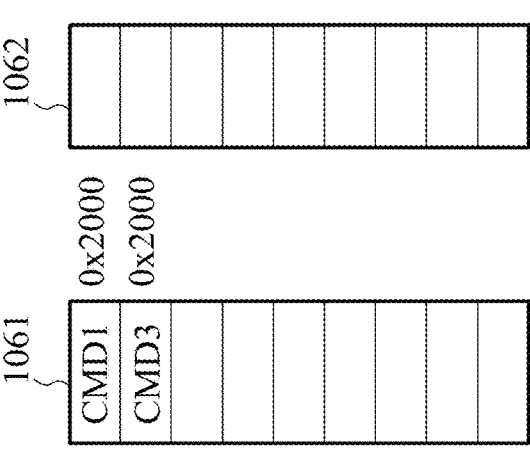
Figure 9A:
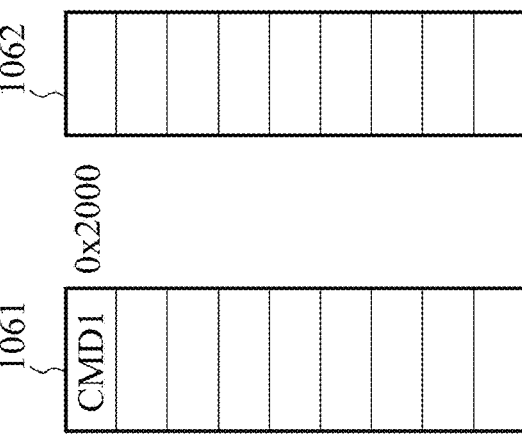

FIG. 6 is a flowchart of operations associated with a write command in accordance with yet another embodiment of the present disclosure. FIGS. 9A to 9C are diagrams of the submission queue 1061 and the completion queue 1062 of the solid-state storage device 10 according to the embodiment of FIG. 6 of the present disclosure.

In some embodiments, when the host 20 seeks to store the first data in the solid-state storage device 10, the processor 202 stores the first data corresponding to a write command CMD1 into the data registers 2043 (arrow 622), and writes the write command CMD1 to the submission queue 2041 (arrow 624). For example, if the write command CMD1 is to write the first data with a size of 16 KB to the logical address of 0x2000, the content of the write command CMD1 includes the logical address of the first data, such as 0x2000, and the size of the first data, such as 16 KB.

In some embodiments, the controller 102 of the solid-state storage device 10 can periodically check for new access commands in the submission queue 2041. The controller 102 may fetch the write command CMD1 from the submission queue 2041 (arrow 626), and record the fetched write command CMD1 in the submission queue 1061 of the volatile memory 106 (arrow 628), as shown in FIG. 9A.

Similarly, after the controller 102 fetches the write command CMD1 from the submission queue 2041, the controller 102 does not execute the fetched write command CMD1, indicating that the controller 102 does not immediately write the first data corresponding to the write command CMD1 to the non-volatile memory 108. At this time, the write command CMD1 is pending, and the controller 102 will wait for the next access command. Meanwhile, the write command CMD1 will remain recorded in the submission queue 1061, and the first data corresponding to the write command CMD1 will remain stored in the data registers 2043 of the host 20.

If host 20 subsequently issues a write command CMD3 to write second data to the solid-state storage device 10, the write command CMD3 indicates that the second data is to be written to a location at the logical address of 0x2000, and content of the write command CMD3 includes the logical address 0x2000 of the second data to be written. At this time, the processor 202 stores the second data corresponding to the write command CMD3 in the data registers 2043 (arrow 630), and writes the write command CMD3 to the submission queue 2041 (arrow 632). In some embodiments, the physical space configuration information corresponding to the write command CMD1 and CMD2 can be different, indicating that the first data corresponding to the write command CMD1 and the second data corresponding to the write command CMD2 are stored in different physical address spaces within the data registers 2043.

Next, the controller 102 of the solid-state storage device 10 may fetch the write command CMD3 from the submission queue 2041 (arrow 634), and record the fetched write command CMD3 in the submission queue 1061 of the volatile memory 106 (arrow 636), as shown in FIG. 9B.

In an embodiment of the present disclosure, when the controller 102 receives a write command from the host 20, the controller 102 will first check for a previous write command with the same logical address as the write command in the submission queue 1061, and decide the processing method of the write command based on the determination result.

FIG. 6 and FIGS. 9A to 9C illustrate processing of the write command when there is a previous write command with the same logical address as the write command in the submission queue 1061. When the controller 102 determines that the logical address of the write command CMD3 issued by the host 20 is the same as the logical address of the write command CMD1, the controller 102 deletes the write command CMD1 from the submission queue 1061 (arrow 638) to retain the write command CMD3, and the command completion information of the write command CMD1 (or the write command CMD1 itself) is recorded in the completion queue 1062 (arrow 640), as shown in FIG. 9C. The controller 102 then writes the command completion information of the write command CMD1 to the completion queue 2042 of the host 20 (arrow 642), and deletes the entry corresponding to the write command CMD1 from the submission queue 2041 of the host 20 (arrow 644).

For example, the controller 102 can set the phase tag corresponding to the command completion information of the write command CMD1 in the completion queue 2042 to 1, and send an interrupt signal to the processor 202 to notify the processor 202 that new command completion information has been submitted to the completion queue 2042. Accordingly, when the processor 202 receives the interrupt signal, the processor 202 can use the phase tag to view newly submitted entries in the completion queue 2042. When the newly submitted entry reports that the write command CMD1 has executed successfully, the processor 202 closes the events associated with the write command CMD1 and record that the first data of the write command CMD1 has been successfully written to the solid-state storage device 10.

It should be noted that, as shown in FIG. 9C, although the write command CMD3 has replaced the original write command CMD1 in the submission queue 1061 of the solid-state storage device 10, the controller 102 will also not execute the write command CMD3, indicating that the controller 102 does not program the second data corresponding to the write command CMD3 to the non-volatile memory 108. In other words, the second data corresponding to the write command CMD3 is still stored in the data registers 2043 of the host 20, and pending, while controller 102 waits for the next access command.

In addition, in the aforementioned embodiment, the controller 102 fetches the write command CMD1 from the submission queue 2041 (arrow 626) and then records the command completion information of the write command CMD1 to the completion queue 1062 (arrow 640). This means that from the moment the solid-state storage device 10 receives the write command CMD1 until it notifies the host 20 that the write command CMD1 is completed, the first data corresponding to the write command CMD1 is not programmed to the non-volatile memory 108. This approach helps reduce access to the non-volatile memory 108, thereby increasing the service life thereof.

FIG. 7 is a flowchart of a data access method for use in a solid-state storage device in accordance with an embodiment of the present disclosure.

In step 710, the controller 102 of the solid-state storage device 10 fetches an access command from the host 20, and records the access command in the submission queue 1061 of the solid-state storage device 10. The access command may include a read command, a write command, etc. Next, in step 720, the controller 102 determines whether there is a write command with the same logical address as the access command in the submission queue 1061 of the solid-state storage device 10. Finally, in step 730, the processing method of the access command is decided based on the determination result.

FIG. 8A is a flowchart of a data access method 800A of a read command in accordance with the embodiment of FIG. 7 of the present disclosure.

In step 802, the controller 102 of the solid-state storage device 10 fetches a read command from the host 20, and records the same to the submission queue 1061 of the solid-state storage device 10.

In step 804, the controller 102 determines whether there is a write command with the same logical address as the read command in the submission queue 1061. When the controller 102 determines that there is a write command with the same logical address as the read command in the submission queue 1061, step 806 is executed. When the controller 102 determines that there is no write command with the same logical address as the read command in the submission queue 1061, step 808 is executed. For example, the controller 102 can search for the logical addresses of entries corresponding to all previously stored write commands in the submission queue 1061, and determine whether any logical address of the previously stored write commands in these entries is the same with the logical address of the read command.

As previously mentioned, in an embodiment of the present disclosure, after fetching the write command from the host 20, the controller 102 of the solid-state storage device 10 will not continue to execute the fetched write command, but wait for the next access command. At this time, the write command will be pending and remain recorded in the submission queue 1061 of the solid-state storage device 10, while the first data corresponding to the write command will remain stored in the data register 2043 of the host 20. Accordingly, when the controller 102 of the solid-state storage device 10 subsequently receives a read command, the write command with the same logical address as the read command may still be recorded in the submission queue 1061 of the solid-state storage device 10, and is pending.

In step 806, the controller 102 obtains the first data corresponding to the write command from the system memory 204 of the host 20, and stores the first data in the volatile memory 106 of the solid-state storage device 10.

In step 808, the controller 102 reads the second data corresponding to the read command from the non-volatile memory 108, and stores the second data in the volatile memory 106. For example, the logical addresses of one or more write commands previously written to the submission queue 1061 are different from the logical address corresponding to the read command, indicating that the second data at the logical address corresponding to the read command has been programmed into the non-volatile memory 108, and the controller 102 needs to read the second data from the non-volatile memory 108 according to the read command.

In step 810, the controller 102 transmits the first data or the second data to the host 20 in response to the read command. For example, the controller 102 determines where to obtain the data required for the read command based on the determination result of whether there is a write command with the same logical address as the read command in the submission queue 1061, and returns the first data or the second data corresponding to the read command to the host 20.

In step 812, the controller 102 records the command completion information of the read command in the completion queue 1062, and deletes the read command from the submission queue 1061. For example, when the controller 102 successfully transmits the first data or the second data corresponding to the read command to the host 20, the controller 102 will record the command completion information corresponding to the read command to the completion queue 1062, and delete the read command from the submission queue 1061. In addition, the controller 102 can also write the command completion information of the read command into the completion queue 2042 of the host 20 and delete the read command from the submission queue 2041 of the host 20.

In step 814, the controller 102 waits for the next access command. In some embodiments, the access command may be a write command or a read command, and each time the controller 102 obtains a new access command from the submission queue 2041 of the host 20, the controller 102 will search for previous write commands with the same logical address in the submission queue 1061.

Figure 8B:
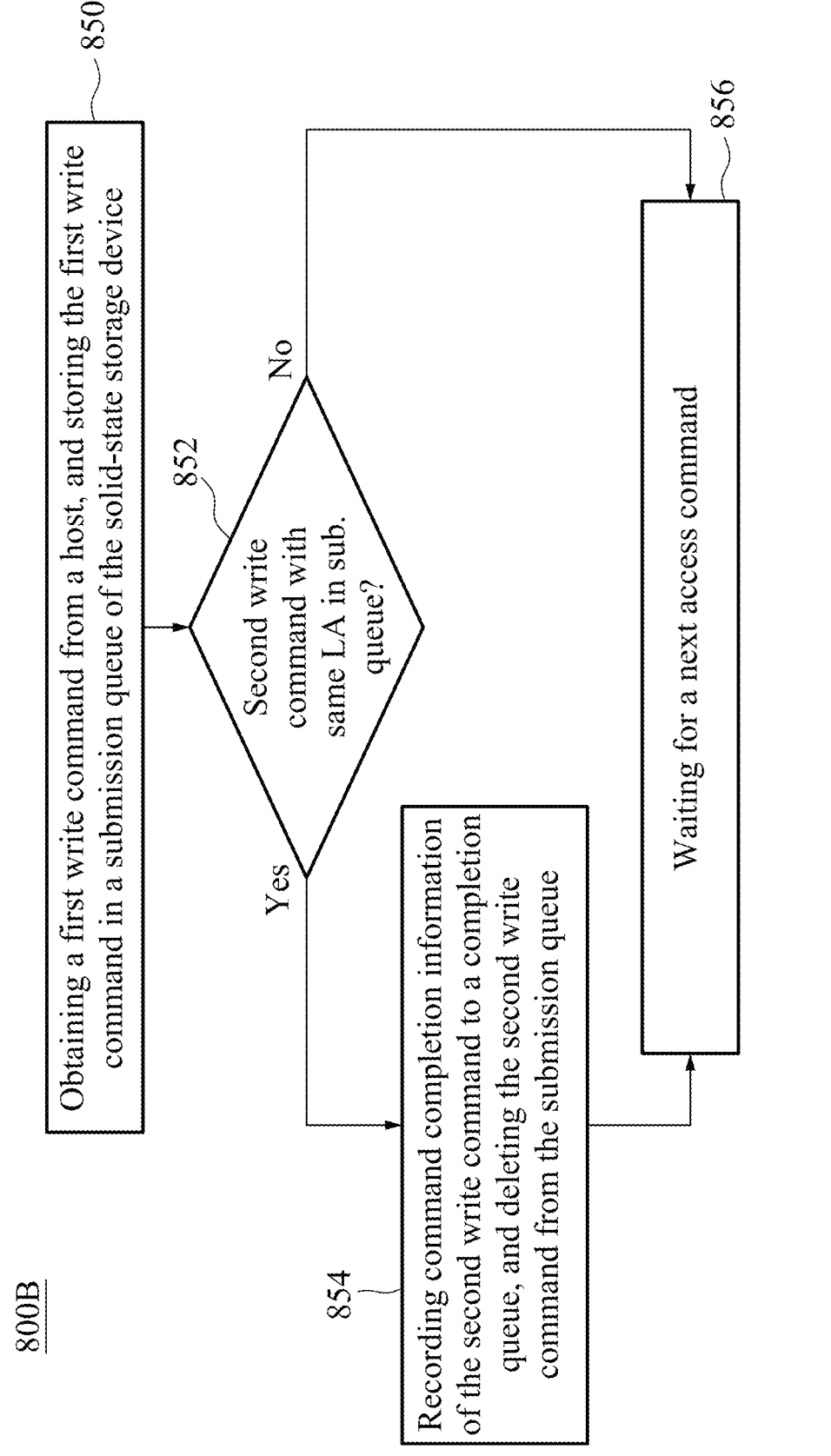
FIG. 8B is a flowchart of a data access method 800B of a write command in accordance with the embodiment of FIG. 7 of the present disclosure.

FIG. 8B is a flowchart of a data access method 800B of a write command in accordance with the embodiment of FIG. 7 of the present disclosure.

In step 850, the controller 102 of the solid-state storage device 10 fetches a first write command from the host 20, and records the first write command in the submission queue 1061 of the solid-state storage device 10.

In step 852, the controller 102 determines whether there is a second write command with the same logical address as the first write command in the submission queue 1061. When the controller 102 determines that there is a second write command with the same logical address as the first write command in the submission queue 1061, step 854 is executed. When the controller 102 determines that there is no second write command with the same logical address as the first write command in the submission queue 1061, step 856 is executed. For example, the controller 102 can search for the logical addresses of entries corresponding to all previously stored write commands in the submission queue 1061, and determine whether there is any second write command with the same logical address as the first write command in these entries.

In step 854, the controller 102 records the command completion information of the second write command to the completion queue 1062, and deletes the second write command from the submission queue 1061. For example, when the controller 102 determines that there is a second write command with the same logical address as the first write command in the submission queue 1061, the controller 102 deletes the second write command from the submission queue 1061, and records the command completion information of the second write command to the completion queue 1062. In addition, the controller 102 may also write the command completion information of the second write command into the completion queue 2042 of the host 20, and delete the second write command from the submission queue 2041 of the host 20.

In step 856, the controller 102 waits for the next access command. In some embodiments, the access command may be a write command or a read command, and each time the controller 102 obtains a new access command from the submission queue 2041 of the host 20, the controller 102 will searches for a previous write command with the same logical address in the submission queue 1061 of the solid-state storage device 10.

In some embodiments, when the memory space usage of the non-volatile memory 108 exceeds a predetermined threshold (e.g., more than 90%), the controller 102 will initiate the flows shown in FIG. 7 and FIG. 8 to reduce the memory space usage of the volatile memory 106. This can also reduce access to the non-volatile memory 108. In some embodiments, the solid-state storage device 10 can be designed to have the flows shown FIG. 7 and FIG. 8 as the basic processing process of access commands, rather than starting them under specific conditions.

In an embodiment of the present disclosure, when the access command received by the solid-state storage device 10 is a write command, the controller 102 will not immediately execute the write command, indicating that the controller 102 will not program the data corresponding to the write command to the non-volatile memory 108. Instead, the controller 102 maintains the write command pending and waits for the next access command. In addition, depending on whether the next access command is a read command or a write command, the controller 102 of the solid-state storage device 10 can process the corresponding read command or write command according to the flow of FIG. 8A or FIG. 8B.

According to the embodiments proposed in the present disclosure, the number of read, write and erase operations of the non-volatile memory 108 can be significantly reduced, thereby increasing service life thereof. In addition, reducing the number of write operations of the non-volatile memory 108 can also decrease invalid data within the data blocks of the non-volatile memory 108. This allows the controller 102 to reduce the frequency of garbage collection operations of the non-volatile memory 108, preventing the internal bandwidth of the solid-state storage device 10 from being occupied thereby. Furthermore, according to the embodiment of the present disclosure, the controller 102 does not program the data of the write command into the non-volatile memory 108, but allows the data of the write command to be temporarily stored in the system memory 204 of the host 20, reducing the memory usage space of the volatile memory 106 in the solid-state storage device 10 and improving processing performance thereof.

Recitation of the present disclosure herein with preferred embodiments is not intended to limit the scope thereof. Persons of ordinary skill in the art could easily modify the same without departing from the intended spirit and scope thereof. Therefore, the actual scope of the present disclosure shall be determined by the claims appended hereto.

What is claimed is:

1. A solid-state storage device, configured to be electrically connected to a host, the solid-state storage device comprising:
    a controller;
    a non-volatile memory, electrically connected to the controller; and
    a volatile memory, electrically connected to the controller, wherein the volatile memory comprises a submission queue and a completion queue;
    wherein the controller is configured to fetch an access command from the host, and to record the access command in the submission queue, wherein the access command corresponds to a first logical address;
    wherein the controller is configured to determine whether a first write command is in the submission queue to generate a determination result, wherein the first write command corresponds to a second logical address identical to the first logical address; and
    wherein the controller is configured to decide a processing method of the access command according to the determination result,
    wherein when the access command is a read command and the controller determines that the first write command exists in the submission queue, the processing method comprises:
    the controller being configured to obtain first data corresponding to the first write command from a system memory of the host according to the first write command, and to store the first data to the volatile memory;
    the controller being configured to read the first data from the volatile memory, and to provide the first data to the host; and
    the controller being configured to record the read command in the completion queue, and to delete the read command from the submission queue.

2. The solid-state storage device of claim 1, wherein when the access command is a read command and the controller determines that the first write command does not exist in the submission queue, the processing method comprises:
    the controller being configured to obtain second data corresponding to the read command from the non-volatile memory according to the read command, and to write the second data to the volatile memory;
    the controller being configured to read the second data from the volatile memory, and to provide the second data to the host; and the controller being configured to record the read command in the completion queue, and to delete the read command from the submission queue.

3. The solid-state storage device of claim 1, wherein when the access command is a second write command and the controller determines the first write command exists in the submission queue, the processing method comprises: the controller being configured to record the first write command in the completion queue, and to delete the first write command from the submission queue.

4. The solid-state storage device of claim 3, wherein the second write command is pending, and the controller does not program write data corresponding to the second write command to the non-volatile memory.

5. The solid-state storage device of claim 1, wherein when the access command is a second write command and the controller determines that the first write command does not exist in the submission queue, the processing method comprises: the controller being configured to wait for a next access command, and maintain the second write command pending, wherein write data corresponding to the second write command remains stored in a system memory of the host.

6. A data access method, for use in a solid-state storage device, wherein the solid-state storage device is electrically connected to a host and comprises a controller, a volatile memory, and a non-volatile memory, the method comprising:

utilizing the controller to fetch an access command from the host, and to record the access command in a submission queue of the volatile memory, wherein the access command corresponds to a first logical address;

utilizing the controller to determine whether a first write command exists in the submission queue to generate a determination result, wherein the first write command corresponds to a second logical address identical to the first logical address; and utilizing the controller to decide a processing method of the access command according to the determination result, wherein when the access command is a read command and the controller determines that the first write command exists in the submission queue, the processing method comprises:

utilizing the controller to obtain first data corresponding to the first write command from a system memory of the host according to the first write command, and to store the first data to the volatile memory;

utilizing the controller to read the first data from the volatile memory, and to provide the first data to the host; and utilizing the controller to record the read command in a completion queue of the volatile memory, and to delete the read command from the submission queue.

7. The method of claim 6, wherein when the access command is a read command and the controller determines that the first write command does not exist in the submission queue, the processing method comprises:

utilizing the controller to obtain second data corresponding to the read command from the non-volatile memory according to the read command, and to write the second data to the volatile memory;

utilizing the controller to read the second data from the volatile memory, and to provide the second data to the host; and utilizing the controller to record the read command in a completion queue of the volatile memory, and to delete the read command from the submission queue.

8. The method of claim 6, when the access command is a second write command and the controller determines the first write command exists in the submission queue, the processing method comprises: utilizing the controller to record the first write command in a completion queue of the volatile memory, and to delete the first write command from the submission queue.

9. The method of claim 8, wherein the second write command is pending, and the controller does not program write data corresponding to the second write command to the non-volatile memory.

10. The method of claim 6, wherein when the access command is a second write command and the controller determines that the first write command does not exist in the submission queue, the processing method comprises: utilizing the controller to wait for a next access command, and maintain the second write command pending, wherein write data corresponding to the second write command remains stored in a system memory of the host.

* * * * *